United States Patent [19]

Carrouset

[11] Patent Number: 5,139,391
[45] Date of Patent: Aug. 18, 1992

[54] ROTARY MACHINE WITH NON-POSITIVE DISPLACEMENT USABLE AS A PUMP, COMPRESSOR, PROPULSOR, GENERATOR OR DRIVE TURBINE

[76] Inventor: Pierre Carrouset, II rue Humblot, 75 015 Paris, France

[21] Appl. No.: 576,442
[22] PCT Filed: Mar. 17, 1989
[86] PCT No.: PCT/FR89/00119
 § 371 Date: Sep. 10, 1990
 § 102(e) Date: Sep. 10, 1990
[87] PCT Pub. No.: WO89/09342
 PCT Pub. Date: Oct. 5, 1989
[51] Int. Cl.$^5$ .................................................. F01D 5/00
[52] U.S. Cl. ........................................ 415/74; 415/143; 415/191; 415/208.1; 416/177
[58] Field of Search ................................ 415/71-75, 415/47-48, 191, 208.1, 143; 416/176, 177

[56] References Cited

U.S. PATENT DOCUMENTS

| | | | |
|---|---|---|---|
| 481,882 | 8/1892 | Woodruff | 415/74 |
| 624,761 | 5/1899 | Dingman | 416/176 |
| 1,307,834 | 6/1919 | Ryan | 415/72 |
| 3,806,278 | 4/1974 | Grennan | 415/170.1 |
| 4,019,829 | 4/1977 | Knopfel et al. | 415/143 |
| 4,990,053 | 2/1991 | Rohne | 415/143 |

FOREIGN PATENT DOCUMENTS

| | | | |
|---|---|---|---|
| 0058558 | 9/1891 | Fed. Rep. of Germany . | |
| 3048436 | 9/1981 | Fed. Rep. of Germany . | |
| 0086315 | 7/1869 | France | 415/72 |
| 0371444 | 3/1907 | France . | |
| 0402874 | 10/1909 | France . | |
| 0372735 | 9/1930 | France . | |
| 0720259 | 2/1932 | France . | |
| 1473299 | 3/1967 | France . | |
| 0284616 | 10/1970 | U.S.S.R. | 415/72 |
| 19338 | of 1912 | United Kingdom . | |
| 14836 | of 1913 | United Kingdom . | |
| 0012038 | 5/1915 | United Kingdom . | |
| 1335845 | 10/1973 | United Kingdom . | |

*Primary Examiner*—Edward K. Look
*Assistant Examiner*—Christopher M. Verdier
*Attorney, Agent, or Firm*—Body, Vickers & Daniels

[57] ABSTRACT

A rotary machine, having non-positive, displacement, which can be used as a pump, compressor, generator or drive turbine wherein the rotor is form by a particular combination of paddles and blades which improves fluid flow through the rotary machine. The paddle and blade configuration of the rotor utilizes the Archimedes screw principal to enhance the fluid flow characteristics and resist cavitation in the rotor chamber.

35 Claims, 9 Drawing Sheets

ROTARY MACHINE WITH NON-POSITIVE DISPLACEMENT USABLE AS A PUMP, COMPRESSOR, PROPULSOR, GENERATOR OR DRIVE TURBINE

The present invention relates to machines that use kinetic energy and centrifugal force to carry out transfers between quantities of work and fluids and vice versa.

BACKGROUND OF THE INVENTION

Known equipment such as propellers, centrifugal turbines, spiral centrifuges, etc. encounter well known difficulties as to the handling of fluids as soon as extreme conditions are approached, particularly in the case of a considerable increase in rotational speed. The minimum operating limits of such equipment is related to the suction pressure. Whenever the pressure in a liquid drops below the vapor pressure corresponding to its temperature, the liquid will vaporize, resulting in cavitation. To avoid cavitation, it is necessary to maintain a required net positive suction head (NPSH) which is equivalent to the total head of liquid at the equipment centerline less the vapor pressure. The use of the Archimedes screw having an increasing diameter over the longitudinal length of the screw, in the form of a discharge corkscrew, is the best known remedy to avoid cavitation of liquids or the exaggerated expansion of gases in the inlet of the equipment.

THE PRESENT INVENTION

The machine that is the object of the present invention enables these drawbacks to be attenuated by the direct introduction of the fluid into the interior of an Archimedes screw increasing in diameter to form a rotor, utilizing a circular chamber to guides and compresses the fluid vanes towards the rotor, designing the rotor with better aerodynamics of the rotor attacking edges and introducing guiding elements in the chamber.

The present machine is of the type comprising a rotary having at least one paddle shaped as a hollow spiral and at least one blade situated around the axis of rotation of the rotor. The present invention incorporates a circular rotor chamber externally enclosing the rotor which forms an input for bringing in the fluid and to prevent fluid from leaking from the machine.

In accordance with one feature of the present invention, the machine comprises a rotor having at least one blade and at least one paddle situated around the rotation axis of the rotor. The pitch and diameter of both the paddles and blades in the rotor may change as the blades and paddles progress from the front to the rear of the rotor. The machine further comprises a circular section of the rotor chamber upstream of the rotor. This section of the chamber comprises fluid compression elements which create a fluid input guide into the rotor. This section of the rotor chamber further acts to compress the fluid and prevent leakage of the fluid from the machine. The fluid is drawn into the rotor chamber by the rotor blades and rotor paddles. The rotor blades draw the fluid in such a manner so as to create a peripheral flow of fluid about the rotor. The rotor paddles, on the other hand, channel the fluid in such a manner so as to form a central flow of the fluid through the rotor chamber.

In accordance with another feature of the present invention, the profile of the revolution area swept by the attacking edge of the blade is delimited laterally on both sides of its axis of symmetry by a plane segment that is substantially parallel or slightly conical to the rotor axis at the rear of the rotor and then prolonged by a segment converging towards the front of the rotor. Stated in another manner, the blade revolution area profile takes on the shape similar to that of a dome. At the front of the rotor, the rotor paddle and rotor blades converge toward the central axis of the rotor. The pitch of the paddle and the blades at the front of the rotor are very similar and operate in unison to channel the fluid in the rotor chamber. The pitch of the rotor paddles relative to the central rotor axis is smallest at the front of the rotor and may increase as the paddle blades spiral outwardly from the rotor central axis and toward the rear of the rotor.

The rotor blades each have a curved peripheral edge in the rotational direction of the rotor. The rotor paddles each have two edges, the external attacking edge is inclined towards the rear of the rotor in the form of a spout to improve the penetration of the peripheral flow of the fluid, and the inside edge is also curved towards the rear of the rotor in the form of a spout to encourage the conversion of the peripheral flow into a central flow.

The rotor can be comprised of blades limited to the spaces between the paddles, wherein each blade extends radially and through a portion of the circumference between the paddles, in a space defined by the inner area of the paddle blades which forms an area similar in shape of the tip of a sharpened pencil. The design and pitch of the rotor blades is such that the peripheral flow of the fluid at the front of the rotor chamber is channeled to the rear of the rotor chamber.

The radiating part of the paddle may attenuate or disappear level at the front of the prolongation of the blade and grow again or arise again in order to be attached to the following blade.

The interior of the blade may be made integral with the shaft of the rotor and whose diameter may widen out along its longitudinal axis as the blade progresses from the front to the rear of the rotor, thus forming a closed or semi-open turbine.

According to a preferential implementation of the design of the rotor, the blades exceed the largest diameter of the paddles at the rear of the rotor to form a centrifugal turbine in which the extremity of the blades is directed laterally towards the exterior. At the output of the turbine, the rotor blades have a rear surface that is inclined with respect to the rotational axis of the rotor.

According to a first variant of the present invention, the circular chamber which surrounds the rotor externally is static and defines an axial input of fluid flow towards the front of the rotor and the rotor has at least one blade which then takes up an orientation peripheral to the flow of the fluid. The axial input may incorporate additional components enabling the chamber to be connected to a flange through which the fluid may enter.

In a second variant of the present invention, the circular chamber which surrounds the rotor rotates. The circular chamber is typically driven by a shaft traversing the rotor. The rotating circular chamber is comprised of at least one blade to generate, in conjunction with the fluid flow resulting from the kinetic energy produced by the rotating chamber, a circular peripheral flow of fluid.

According to a third variant of the present invention, the circular chamber surrounding the rotor comprises a rotating impulsor. The rotating impulsor is driven by a shaft passing through the rotor. The impulsor is comprised of blades and spiraling paddles wherein the blades are positioned in such a manner so as to support the paddles. The configuration of the paddles and blades of the impulsor are such that the revolution profile area of the impulsor follows the profile of the revolution area swept by the attacking edge of the paddles of the rotor. The rotor paddles are of a material of some width that is formed into a spiral and the inner edges of the paddle define an inner space. The blades of the impulsor extend radially from the front to the rear of the impulsor and are positioned in the inner space of the spiraling paddles. The blade and paddle configuration of the impulsor is designed in a manner to channel fluid towards the rear of the peripheral flow of fluids. The blades of the axial input take on a direction peripheral to the fluid flow. The impulsor compresses the fluid entering the rotor chamber by causing the fluid to penetrate between the impulsor paddles and the impulsor blades to compress and pressurize the fluid as the fluid approaches the rotor.

In accordance with another feature of the present invention, the circular chamber of the rotor consists of circular elements such as cylindrical and conical rings, etc. These circular elements are normally located in the rotor chamber at a point where the circumferential area of the rotating paddles is greatest which is typically located near the rear of the rotor. These circular elements are positioned in the rotor chamber for several purposes such as directing the flow of the fluid at the periphery of the rotor chamber, forming fluid passages in conjunction with seals for use in fluid flow control and/or positioning the rotor in the rotor chamber.

In accordance with yet another feature of the present invention, the number of paddles and blades of the rotor may be different in order to avoid harmonics that can be engendered by the resonating fluid flows.

In another feature of the present invention, the machine may be provided with diffusers at the rear of the rotor to direct the fluid flow and to optimize the reaction forces.

Yet another feature of the present invention, a leak chamber surrounds the rotor chamber to collect fluid which escapes from the rotor chamber during operation of the machine. The leak chamber may partially or completely enclose the whole machine. The leak chamber may contain curved openings near the peripheral edge of the inlet of the rotor chamber. The openings curve into the rotor chamber so as to inject the fluid from the leak chamber into the rotor chamber inlet.

Yet still another feature of the present invention, the machine may include an additional chamber called the flow chamber which encompasses both the rotor chamber and the leak chamber. Both the front and rear edges of the low chamber curve towards the inside of the machine. The fluid accumulated from the rear edge of the flow chamber can be channeled to the front of the machine and can act as a second injector for introducing the accumulated fluid into the inlet of the machine. The flow of fluid from the flow chamber helps control and stabilize the fluid flow through the machine.

In accordance with another feature of the present invention, the radially extending rotor blades diverge away from the central axis of the rotor wherein the inner area between the blades defines a central passageway extending from the front of rotor to the rear of the rotor. The central passageway defined by the blades is particularly evident when the rotor shaft is removed.

Yet another feature of the present invention is the use of sealing rings to reduce leakage and control the fluid flow in the rotor chamber. The seals may be positioned near the attacking edge of the rotor paddles located near the rear of the rotor. These seals are used in conjunction with the circular elements to control leakage from the rotor chamber Seals may also be located at the front and rear flanges of the machine to prevent leakage of fluid entering and exiting the machine. Finally, seals may be located near the rear of the rotor chamber and in proximity to the rear inlet passage of the flow chamber to control the flow of fluid into the flow chamber. Many of the seals within the rotor chamber have some pre-calibrated movement or play wherein the play of the seals controls the leakage of the fluid out the rotor chamber and flow of fluid into the flow chamber. The seals near the flow chamber inlets normally seal at least half of the inlet passage.

Still yet another feature of the present invention is the machine may be used as a propulsing or generating element. In such a machine configuration, the rotor chamber of the machine contains injectors connected to a fluid supply and/or electrodes.

Another feature of the present invention, the machine includes a pressure borings which exist between the circular elements and the fluid chamber and are connected by orifices of small cross-section. In the case of a rotating rotor chamber, the rotor moves within the chamber and does not always maintain its position in the center of the rotor chamber. The pressure boring supplies pressure to the circular elements and adjusts the rotor to be centered in the rotor chamber.

These and other features will become apparent from the following description taken together with the accompanying drawings.

The drawings attached are not exhaustive. The machine is described with its basic geometric elements intentionally schematic in nature in order to better facilitate the understanding of the extremely complex shape. In practice, the shapes are less abrupt and rounded in order to harmonize and encourage the flow of liquid.

BRIEF DESCRIPTION OF THE DRAWINGS

FIG. 8A and 8B top view and a side view of a shows a rotor chamber with spiral inputs;

FIG. 10 and 10B illustrate a top side view and top view of a rotor converted into a centrifugal turbine where the ends of the blades are directed towards the rear and inclined with respect to their rotational axis;

THE PREFERRED EMBODIMENT

Figure 1:
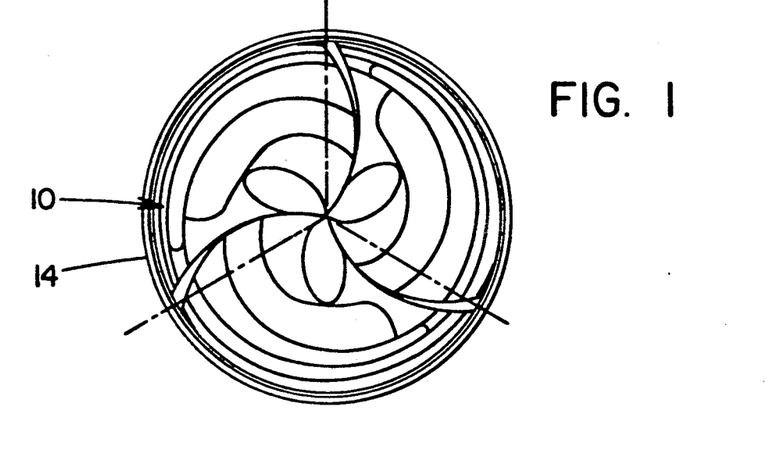
FIG. 1 is a view from the bottom of a machine in accordance with the invention.
Figure 2:
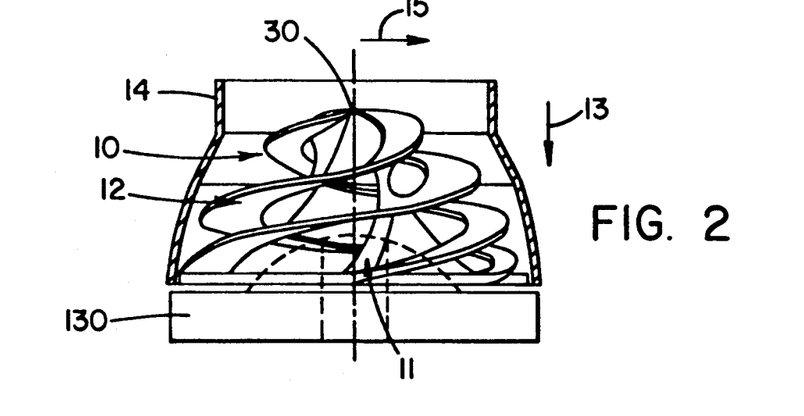
FIG. 2 is the elevation view of a rotor and a cross-sectional view of a circular rotor chamber of the machine in the preceding figure and shows that the output diffuses in the form of plates.
Figure 3:
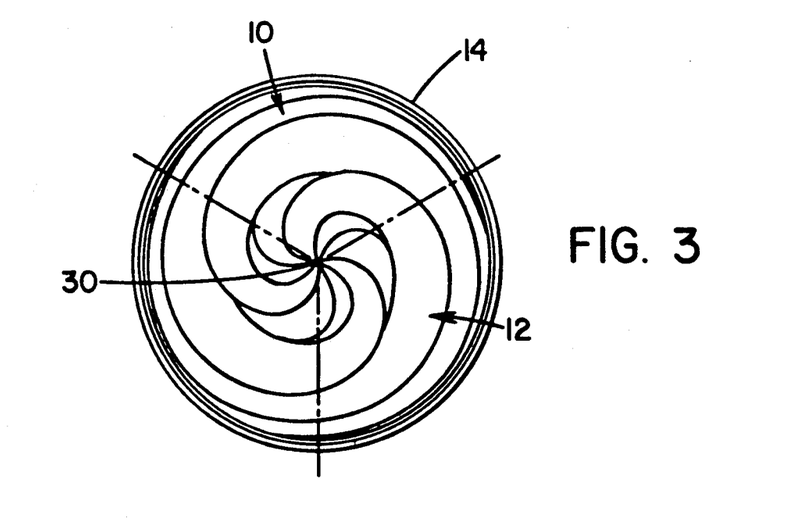
FIG. 3 is the view from above the same machine.
Figure 4A:
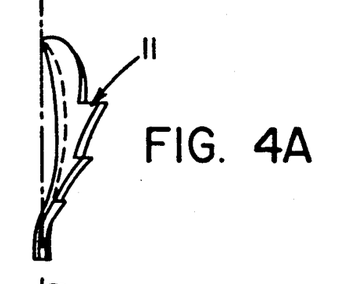
FIG. 4A and 4B illustrate two rotor blade configurations.
Figure 4B:
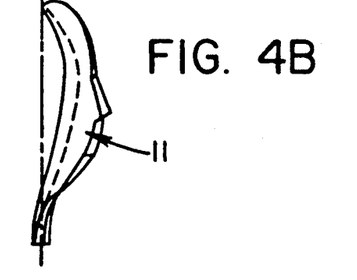
Figure 4C:
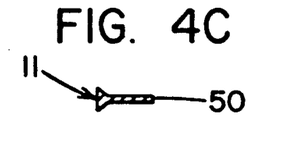
FIGS. 4C-4H illustrate several cross-sections of the rotor blades illustrated in FIGS. 4A and 4B.
Figure 4D:
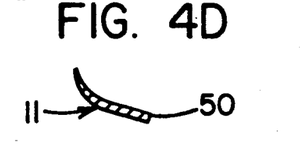
Figure 4E:
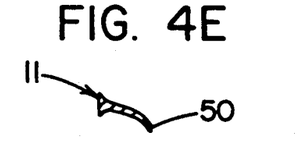
Figure 4F:
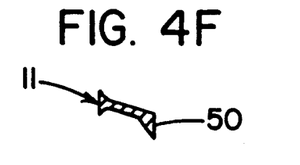
Figure 4G:
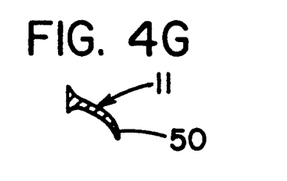
Figure 4H:
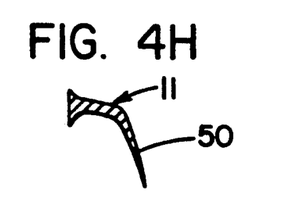

Referring now to the drawings, wherein the showings are for the purpose of illustrating a preferred embodiment of the invention only and not for the purpose of limiting same, FIGS. 1-3 show rotor blades 11 and rotor paddles 12 assembled into a rotor 10 and contained in a rotor chamber 14. The blades 11 are in the form of a spiral. The front of blades 11 are fixed and rolled into spiral paddles 12. This assembly forms a rotor 10. Blades 11 and paddles 12 converge into a point 30 at the front of rotor 10 in order only to present a minimum number of edges that could disrupt the flow of the fluid.

The attacking edge of paddle 12 which covers blade 11 in diameter as paddle 12 spirals from the front to the rear of the rotor as illustrated in FIG. 2 in the direction of the arrow 15 and simultaneously advances longitudinally as shown by arrow 13, thus penetrating and adhering to the fluid veins which tend to escape towards the exterior.

A circular rotor chamber 14 that is antagonistic surrounds rotor 10 and opposes the leak of fluid and compresses the fluid. For the purpose of compressing the fluid in rotor chamber 14, rotor chamber 14 is fitted with compressing elements. The fluid has two separate flow channels through rotor 10, the fluid may pass directly behind rotor 10 using the space between and under the adjacent paddle edges of paddle 12 or the fluid may flow between paddles 12. If the rear of rotor 10 is partially closed, the only way the fluid can avoid rotor 10 is by flowing out the exterior of rotor chamber 14, however, the circular rotor chamber 14 prohibits any fluid from radiating and expanding out of chamber 14 resulting in a local excess pressure which tends to force the penetration of the fluid into rotor 10. The penetration of the fluid veins are greatly facilitated in that the edges of blades 11 and paddles 12 are configured in the form of a spout relative to the fluid flow.

Figure 5:
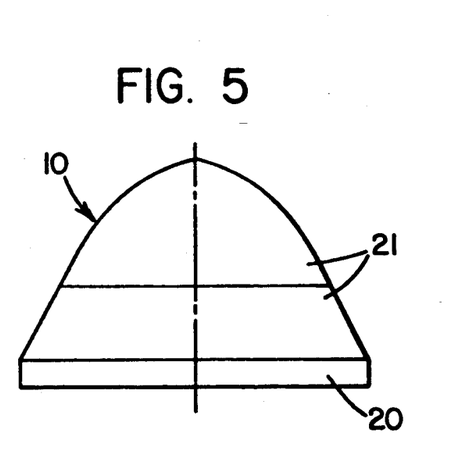
FIG. 5 shows a standard rotor type with a rear plane segment.
Figure 6A:
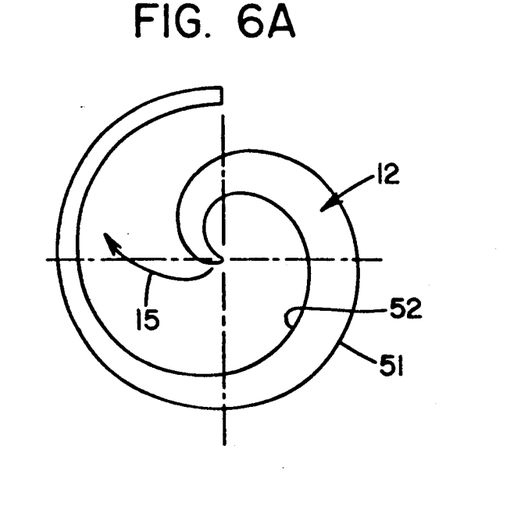
FIGS. 6A and 6B illustrate a top and elevational view of a rotor paddle and illustrate the variation of the paddle step with the increase in the paddle diameter.
Figure 6B:
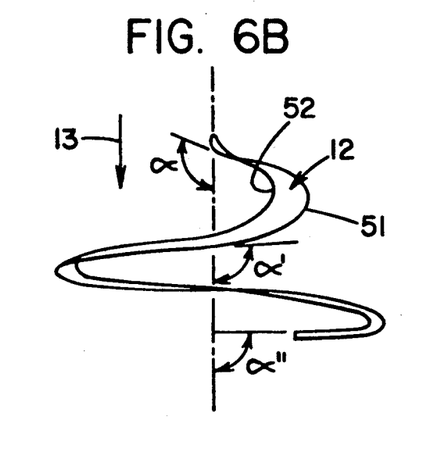
Figure 6C:
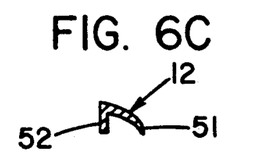
FIGS. 6C-6J illustrate several cross-sections of the paddle throughout the rotor.
Figure 6D:
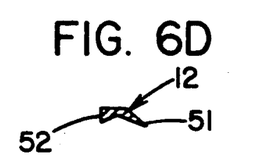
Figure 6E:
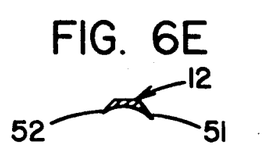
Figure 6F:
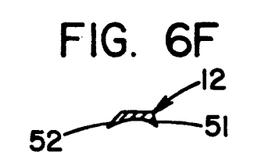
Figure 6G:
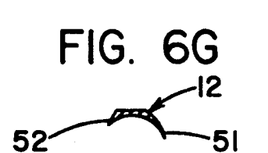
Figure 6H:
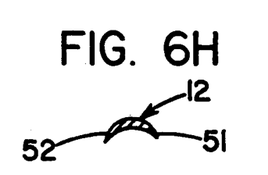
Figure 6I:
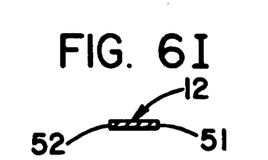
Figure 6J:
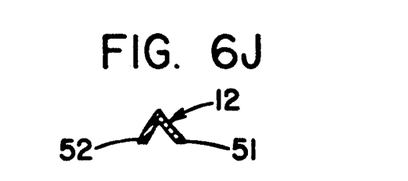

Referring now to FIGS. 4-6, blades 11 have front edges 50 which normally extend between paddles 12. The rear edges of blades 11 either face parallel or perpendicular to the peripheral surface of rotor chamber 14. FIG. 4 illustrates several configurations of the attacking edges 50 of blades 11. Blade edges 50 may vary in configuration throughout the radial length of blade 11. Paddles 12 have a particular external attacking edge 51 configuration which is determined by a tolerance compromise between the acceptance and the refusal of the fluid flowing through rotor chamber 14. Paddle 12 and internal edge 52 directs the external fluid to the peripheral edge of rotor chamber 14 and forms a channel for the internal flow of the fluid. The body of the paddle 12 as defined as the surface between the external edge 51 and the internal edge 52 forms preferably a convex form towards the outside and concaves towards the front to complement, by pushing the fluid, the action of said external edge 51 and internal edge 52. Several configurations of paddle edges are illustrated in FIG. 6. Paddle edges 51 and 52 may vary in configuration throughout the length of paddle 12.

The profile of the revolution surface swept by paddles 12 is shown in FIG. 5. The revolution surface forms a plane segment 20 at the rear of rotor 10 that is substantially perpendicular to the longitudinal axis of rotor 10. Plane segment 20 radiates away from the longitudinal axis of rotor 10 and defines a plane closely adjacent to the peripheral edge of rotor chamber 14 which interacts with sealing rings and circular and/or conical members 50 located along the peripheral edge of chamber 14 to form a seal for preventing the fluid from flowing around rotor 10 and to maintain rotor 10 in the proper place in rotor chamber 10. The profile of paddles 12 converges towards the front 21 of rotor 10. The semi-spherical paddle profile is preferred, conical, ogival shapes or even locally perpendicular shaped profiles can be selected depending on the different parameters of the problems to be solved as related to fluid flow though rotor chamber 14.

Figure 7:
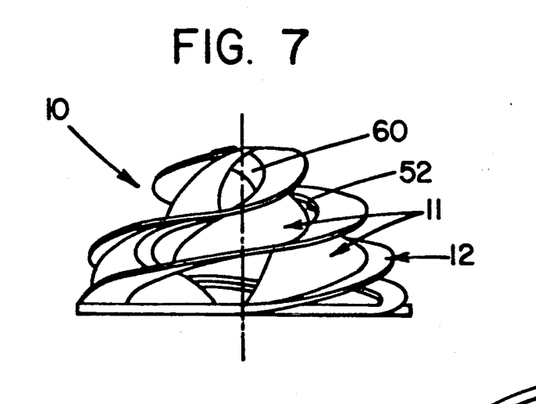
FIG. 7 is a view of a rotor comprising blades limited to the spaces between paddles.
Figure 8A:
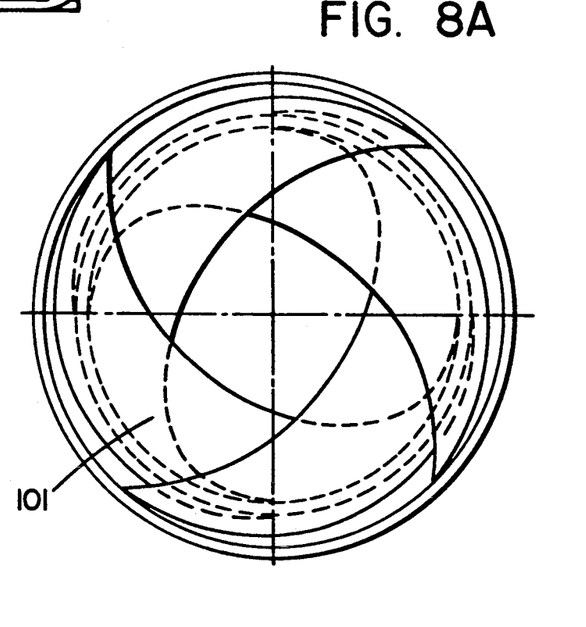
Figure 8B:
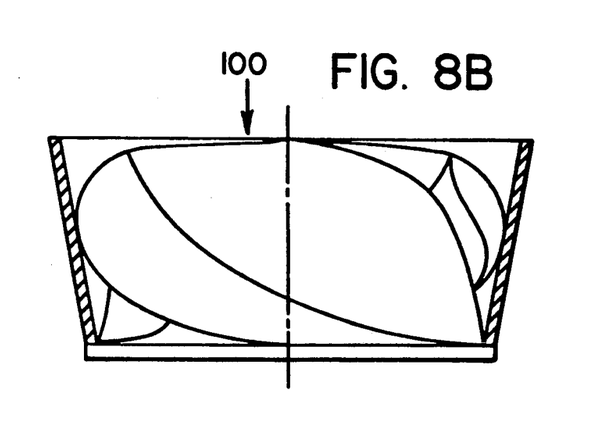

Now referring to FIG. 7, rotor 10 has blades 11 which are positioned in space 60 located between internal edge 52 of paddles 12. Blades 11 extend radially between paddles 12. Blades 11 mechanically maintain the paddles 12 between themselves and facilitate the introduction of fluid towards the interior of rotor 10 and/or push back the fluid veins towards the compressive elements of rotor chamber 14.

Figures 9, 10A:
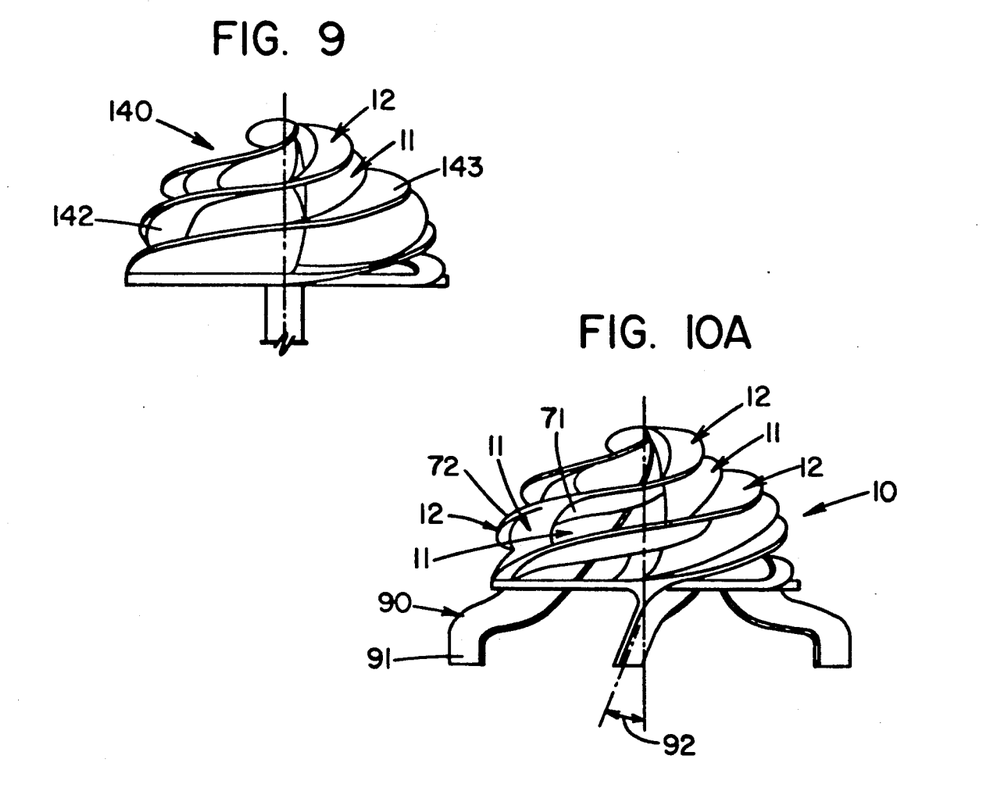
FIG. 9 represents an elevation view of a rotary impulsor.
Figure 10B:
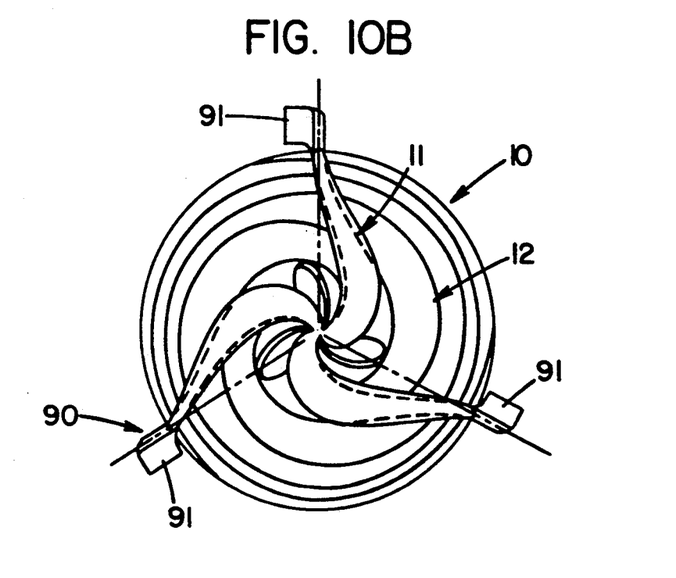

Referring now to FIG. 10, blades 11 extend beyond the rear and the greatest diameter of paddles 12 thus allowing rotor 10 to benefit from the resulting centrifugal force created by the rear edges of blades 11. As a result of this particular configuration of blades 11, the machine is converted into a centrifugal turbine 90. The end of blades 11 projects the fluid towards the outer edge of the rotor. In a preferential configuration of blades 11, the blade ends 91 are oriented towards the rear of rotor 10. The blade ends 91 may also be inclined 92 with respect to the rotor longitudinal axis. The angle of deflection of the rear blade edges 91 improves the flow of the fluid through rotor chamber 14.

The pitch of paddle 12 decreases as paddle 12 radiates farther from the central axis of rotor 10. The pitch of paddle 12 with reference to the longitudinal axis of rotor 10 increases as paddle 12 winds toward the rear of rotor 10. The pitch near the front of rotor 10 approaches zero degrees and increases to about ninety degrees near the rear of rotor 10. Paddle 12 has a larger radius at the rear of rotor 10 than at the front of rotor 10. This pitch profile for paddles 12 is preferable since the velocity of the fluid at the center of rotor chamber 14 is greater than at the periphery of rotor chamber 14, thus the pitch profile of paddles 12 is adjusted relative to this fluid speed.

Figure 14:
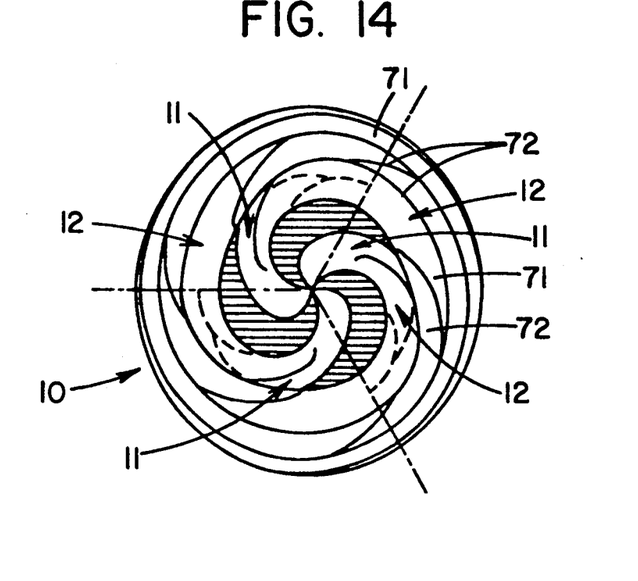
FIG. 14 shows on the rotor the disappearance and the re-appearance of the radiating paddle; and, FIG. 15a and 15b shows the cross-section and top view of the twisted rotor blades.
Figure 15A:
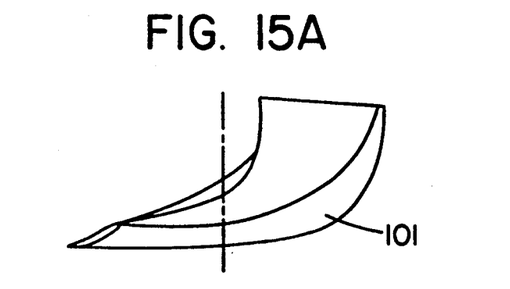
Figure 15B:
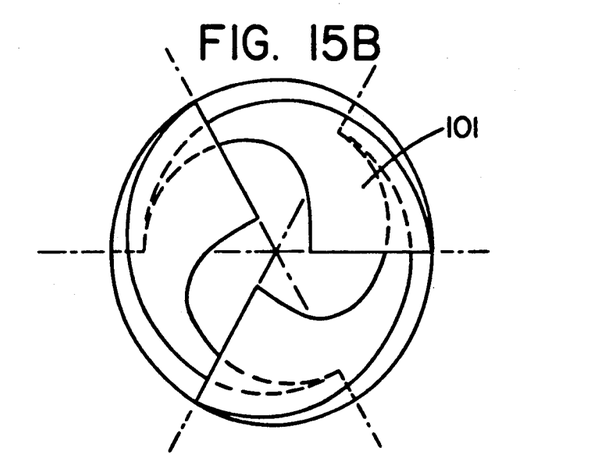

Referring to FIG. 14 where the hatched parts of the figure correspond to empty spaces, the radiating part of paddle 12 attenuates or disappears at the level of the front 71 of the prolongation of blade 11 and increases or starts again 72 afterwards to come and connect with the following blade 11 so as to permit better filling of the back of rotor 10. The inside or rear of blades 11 may be made integral with the shaft. Blades 11 diameter may increase from the front to the rear of rotor 10 to form a flange in the form of a shield to facilitate the production of open or semi-open centrifugal turbines. The number of blades 11 and paddles 12 may be different in order to avoid harmonics caused by resonant fluid flows.

Figure 11:
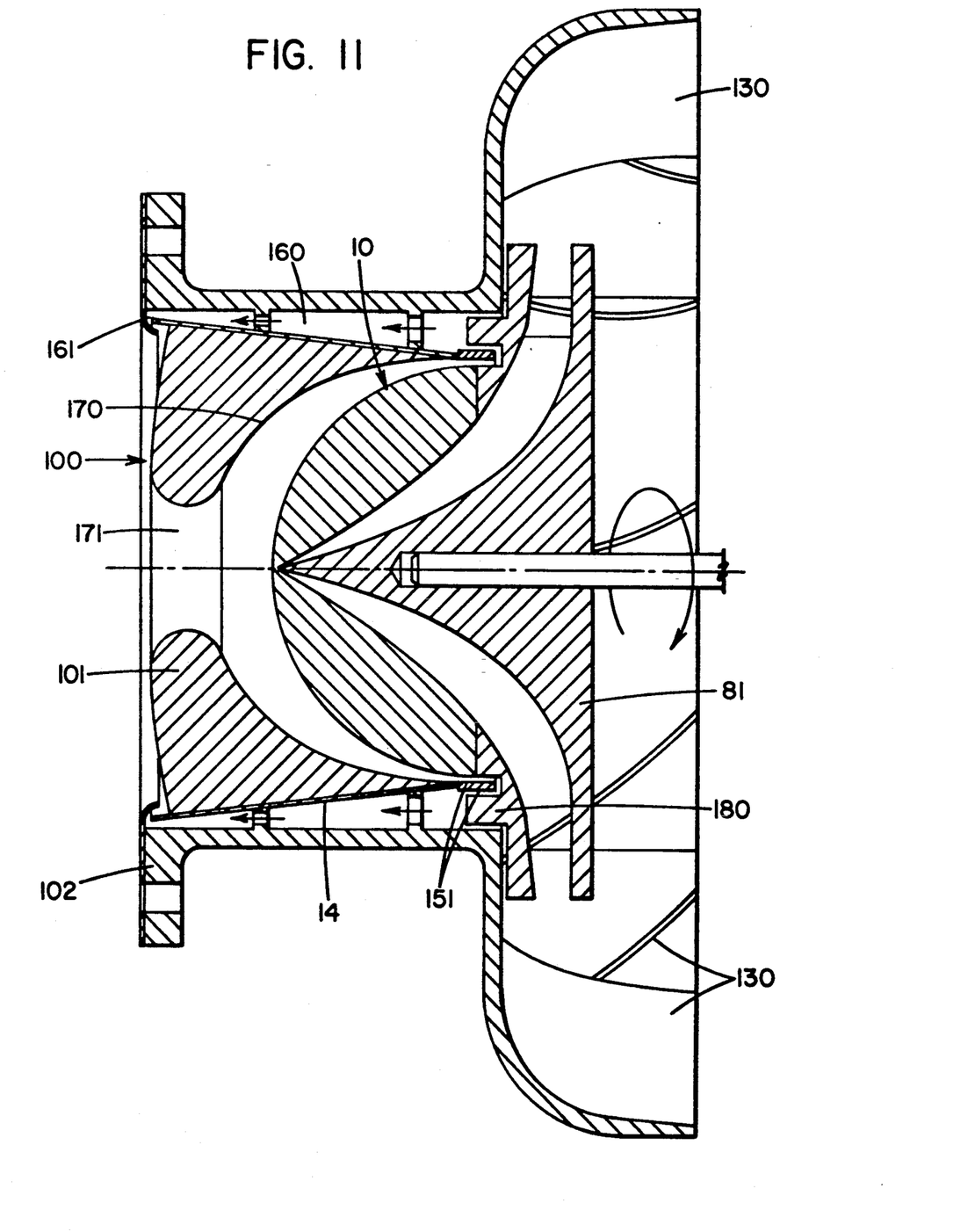
FIG. 11 shows a machine whose circular rotor chamber is static, and wherein the blades move away from the rotor and disappear from the center.

Referring now to FIG. 11, the diffusers 130 are arranged at the rear of the machine in order to orient the fluid flow and to optimize its reaction forces. Such a machine configuration will not be efficient without a circular antagonistic rotor chamber 14 which is fixed and contains an axial input 100 which advantageously contains channel blades 101 which form internal channels and which are inclined in a progressive way in the direction of the rotation of rotor 10. To facilitate the fluid flow into rotor 10, one preferred configuration of channel blade 101 includes the parting of channel blades 101 rear zone 170 away from the longitudinal axis of rotor 10 to define an opening 171. Channel blades 101 are normally not required near the center of rotor chamber 14 since the fluid flow towards the center of rotor chamber 14 is generally less turbulent thus readily flows into rotor 10. In addition, any channel blades 101 situated near the center of rotor chamber 14 must be constructed in a special manner. The particular design required to direct the fluid into rotor 10 is not cost effective in view of the gains verses the drawbacks. As a result, a free passage above the center of rotor 10 is given to the fluid so as to permit a machine design with less efficiency but with greater flexibility of the transformation of the direction of the flow of the fluid in the channels formed by channel blades 101. The circular static rotor chamber 14 is often enclosed in a casing and/or a body which will be made integral with the fluid input elements, for instance by flange 102.

Figure 12:
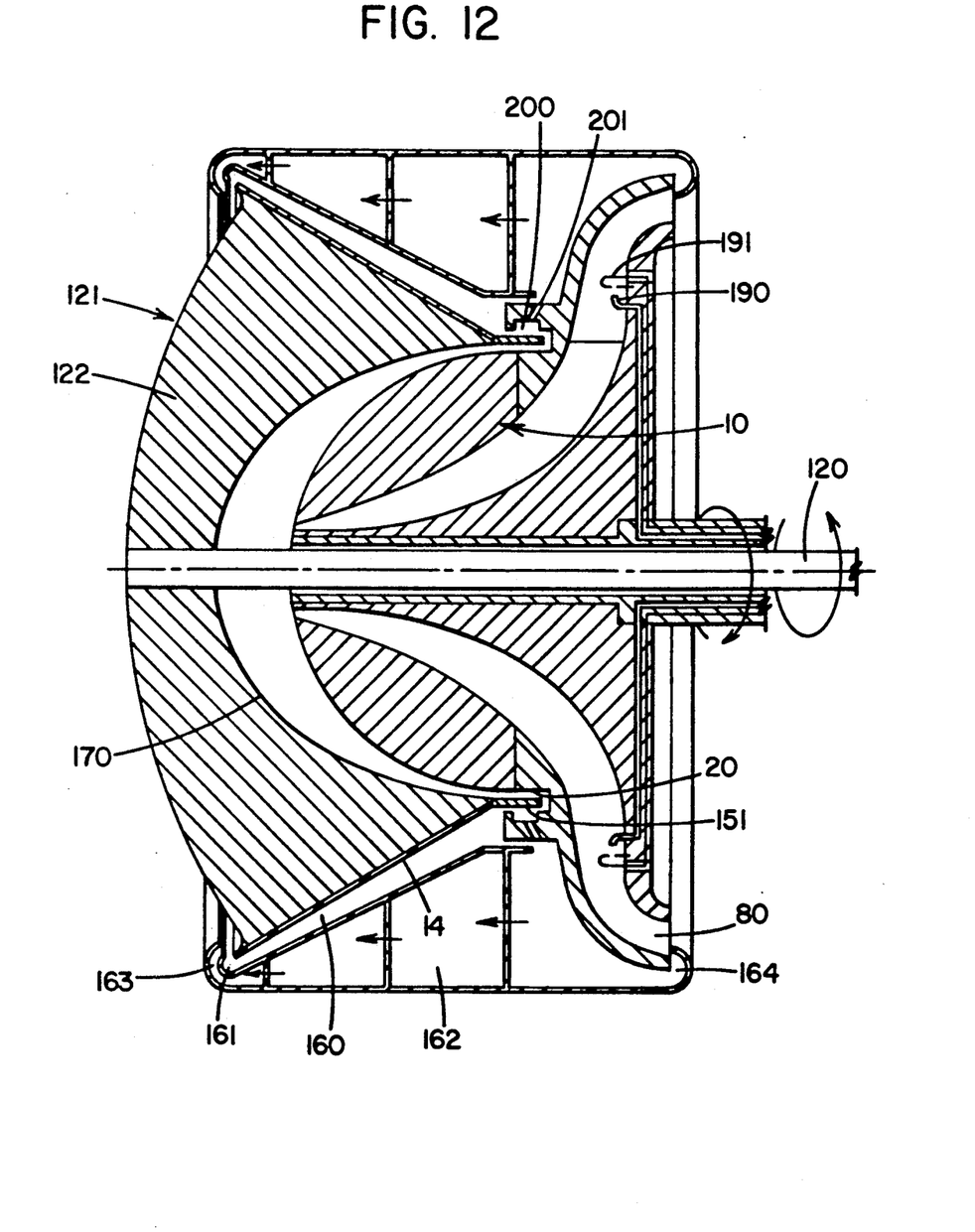
FIG. 12 shows a machine where the circular rotating chamber is rotary and driven by a shaft traversing the rotor, and the rotor chamber includes electrodes, injectors, a leak chamber, a flow chamber, seals with controlled play and a pressure boring.

The circular rotor chamber 14 illustrated in FIG. 12, may rotate and produces a spiral input 121 formed by slicing blades 122 which may be twisted. The rotation of rotor chamber 14 may be carried out by shaft 121 which traverses rotor 10. If the drive takes place from the outside, without a central shaft, slicing blades 122 of the circular rotating rotor chamber 14 will open to the center of rotor chamber 14 to facilitate the introduction of the fluid into this privileged zone. The distance of the rear zone 170 of slicing blades 122 from the peripheral edge of rotor chamber 14 and the distance from paddles 12 is determined by a formula to improve the "hydraulic" flexibility of the system.

Figure 13:
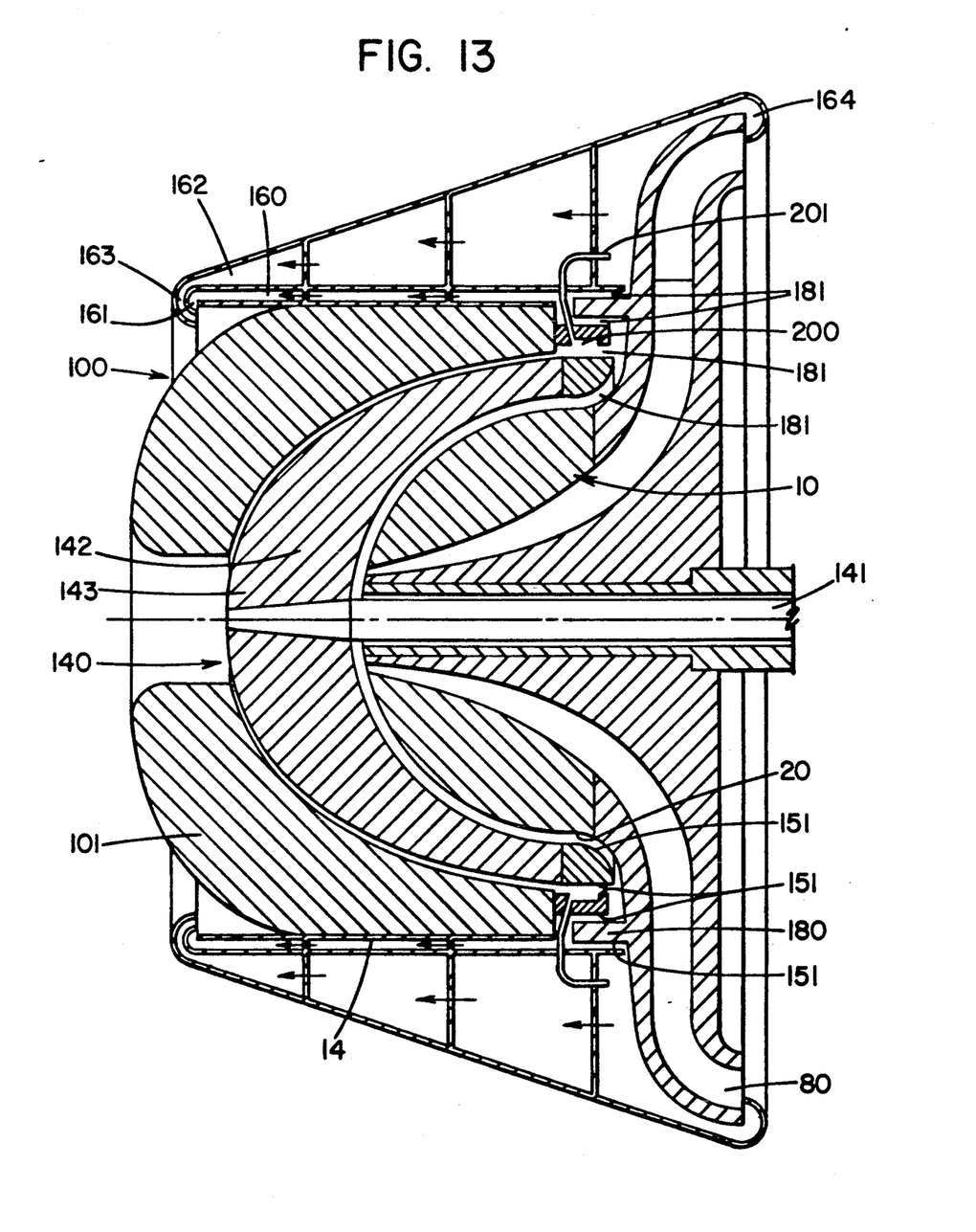
FIG. 13 shows a machine whose circular rotor chamber comprises a fixed axial inlet and a rotating impulsor driven by a shaft traversing the rotor, also shown are the interrelationship of the seals and the pressure boring.

A third method of implementation of circular rotor chamber 14 is illustrated in FIG. 13 and consists of a non-rotating rotor chamber 14 which has an axial input 100. In front of rotor 10 exists rotating impulsor 140 driven by shaft 141 which can traverse, preferentially, rotor 10. Impulsor 140 consists of impulse paddles 143 arranged in spirals having a similar configuration to the configuration of rotor paddles 12 and impulse blades 142 having a similar configuration as rotor blades 11 and are similarly limited to the spaces between impulse paddles 143.

The fluid penetrates via the axial input 100 and is deviated by slicing blades 101 at the front of rotor chamber 14, and which direct the fluid towards the periphery of rotor chamber 14 in the same direction as the direction of rotation of impulsor 140. The fluid is thus compressed and penetrates between the impulse paddles 143 is aided by impulse blades 142 situated in the space between impulse paddles 143. The fluid flow produced by impulsor 140 to rotor 10 causes a desired overpressure in rotor chamber 14.

Referring now to FIGS. 11-13, near the bottom of paddles 12 of rotor 10 there exists plane segment 20 within rotor chamber 14. At a point where plane segment 20 approaches the perimeter of rotor chamber 14, there exists circular and conical surfaces 151, borings 201, sealing rings 180, etc.

Circular and conical surfaces 151 are positioned in such manner so as to prevent a back flow of fluid through rotor chamber 14. As a result, conical and circular surfaces 151 are normally positioned at the rear of impulsor 140, channel blades 101 and rotor 10. The shape of circular and conical surfaces 151 are such that the fluid passing over these surfaces is directed into rotor 10. Circular and conical surfaces 151 may also create small spaces 181 between the respective surfaces and the peripheral edge of rotor chamber 14. Normally sealing ring 180 is located adjacent to circular or conical surfaces 151 to reduce the leakage of fluid out of rotor chamber 14 through spaces 181 created by circular and conical surfaces 151. However, even with use of sealing rings 180, leakage from rotor chamber 14 still occurs in normal operation of rotor 10. During operation of the machine, the fluid passing over sealing rings 180 cause movement in the rings. As a result of the movement of sealing rings 180, a perfect seal is not constantly maintained, thus resulting in leakage out of motor chamber 14.

The fluid that leaks out of rotor chamber 14 is captured in leak chamber 160. Leak chamber 160 is a static chamber that at least partially surrounds rotor chamber 14. Leak chamber 160 collects the escaping fluid and directs the fluid back into the inlet of rotor chamber 14 through leak injectors 161. Leak injectors 161 have a passage opening which normally faces into rotor chamber 14 so that the fluid entering rotor chamber 14 will not inadvertently enter leak injectors 161. The fluid rushing by leak injectors 161 creates a natural vacuum in leak chamber 160 which further facilitates the fluid flow into rotor chamber 14 from leak chamber 160.

Sealing rings 180 may also exists on the front flange 102 or rear the flange of rotor chamber 14. These sealing rings 180 reduce the amount of fluid which leaks from the machine while the fluid enters and exits rotor chamber 14.

Referring now to FIGS. 12-13, the machine may also include a flow chamber 162 which encloses rotor chamber 14 and any existing leak chambers 60. Flow chamber 162 is used in the machine to stabilize the flow of fluids through rotor chamber 14. Flow chamber 162 includes flow inlets 164 which are normally located at the rear of rotor 10 at position 80. Flow inlets 164 have openings which are turned towards the inlet of rotor chamber 14 so that the fluid exiting rotor 10 and flowing along the peripheral edge of rotor chamber 14 may easily enter the openings. A sealing ring 180 is positioned near the opening of flow inlet 164 so as to obstruct the opening. Normally, sealing ring 180 covers at least half of flow inlet 164. The sealing ring is designed to have a pre-calibrated play or movement about the openings such that fluids flowing into the openings may vary depending on the fluid flow characteristics through rotor chamber 14. Flow chamber 162 also contains flow injectors 163 which direct the fluid from flow chamber 164 into the inlet of rotor chamber 14. Flow injectors 163 have openings which are turn in+o the rotor chamber such that the fluid flowing about the openings creates a vacuum in the flow chamber. As a result of this vacuum, the fluid flow out of flow chamber 164 is enhanced.

This machine may be used as a propulsor by means of the use of the force exerted by the differential in pressure produced between the front and rear surfaces. An important increase in output speeds is obtained by introducing a lighting fuel by means of fuel injectors 190 and electrodes 191 into the channels of the centrifugal turbines illustrated in FIG. 12. These fuel injectors 190 and these electrodes 191 can fulfill other functions such as mixtures of fluids, modifications of local electrification conditions, etc.

Referring to FIGS. 12-13, the machine may contain pressure borings 200 located between circular and conical surfaces 151 and flow chamber 162. Each pressuring boring 200 contains small orifices 201 which communicate the pressure differential between the two ends of pressure borings 200. Pressure borings 200 interacts with circular and conical surfaces 151 to maintain and adjust the position of the rear of rotor 10 so as to properly align rotor 10 with the center of rotor chamber 14. When rotor chamber 14 rotates, the forces resulting from the rotating may cause rotor 10 to skew to one side of rotor chamber 14, thus resulting in uneven fluid flows and reduced efficiencies. Rotor 10 may also move in a static rotor chamber 14 due to uneven fluid flow through rotor 10. When rotor 10 moves to one side of rotor chamber 14, the force of the fluid increases on the side of rotor chamber 14 where rotor 10 has deviated to, and the fluid pressure on the side of rotor chamber 14 where rotor 10 deviates away from reduces. As the fluid pressure increases in rotor position 80 near the side of rotor chamber 14 where the rear of rotor 10 deviated to, the fluid flow into flow inlet 164 increases. When the fluid into flow inlet 164 increases, the pressure in flow chamber 162 near low inlet 164 increases. The corresponding flow inlet 164 located at the opposite side of rotor chamber 14 experiences a reduced fluid flow and a corresponding reduction of pressure in flow chamber 162. Pressure boring 200 located in the increased pressure side of flow chamber 162 communicates the increased pressure with conical and circular surfaces 151. The added pressure to the inner surfaces of conical and circular surfaces 151 causes the surfaces to move toward the center of rotor chamber 14, which in turn causes rotor 10 to move towards the center of rotor chamber 14. As rotor 10 repositions itself in the middle of rotor chamber 14, the pressure being applied to conical and circular surfaces 151 around the peripheral edge of rotor chamber 14 equate with each other thus maintain rotor 10 in the center of rotor chamber 14. By centering the rear of rotor 10 with impulsor 140, the efficiencies of the fluid flow throughout rotor chamber 14 are maximized.

The invention is, in any event, not limited to the systems described but on the contrary, covers all the variants that could be made to it without leaving their framework or design. In particular, the addition of cooling devices permitting the reduction of temperature of the recycled fluid and all devices known for the production of centrifugal pumps and compressors are supplementary and applicable to the present invention. The extra rigidity of the construction of this type of machine can be improved by the addition of fillets that also help in obtaining better aerodynamics of the internal circuits. It is also appropriate to admit that by retaining the essential part of the general character of the machine described above, any changes in form that arise from conventional and instinctive laws of fluid flow and mechanical construction will be part of the present invention.

The construction of machines, pumps, turbines, propulsors, etc. according to the present invention may be carried out in cast material, in molds or tooling using, in particular, lost wax techniques. Solutions by assembly of parts that are initially separated, for instance of stamped sheets are also suitable. Metals, composite materials, plastics and all their hybrids are usable.

The application of machines to the present invention concerns all transfers of gas, liquid, or pasty fluids. Vacuum pumps, gas compressors, the recompression of water vapor or steam are particularly concerned. As a whole, all fluids under a low absolute pressure or in vapor pressure equilibrium are involved. The transformation of the energy involved via the differences in pressure and speeds exerted between the suction and discharge surfaces enable to envisage the use of this machine wherever the application of force is necessary such as slaving, pressure generation, transfer of masses, etc. The addition of injectors and electrodes permits the realization of interactions between the elements involved (fluids, fuels, inflammables, electricity, etc.) and authorizes the uses of this machine as a propulsor or a generator, among others.

I claim:
1. A rotary machine for displacing fluids comprising:
a housing having a fluid inlet at one axial end thereof and a fluid outlet at its opposite axial end, said housing generally symmetrical about a longitudinal centerline extending between said inlet and said outlet;
a rotor within said housing including at least one blade and at least one paddle and extending from said inlet at a position generally coincident with said centerline to said outlet at a position generally radially spaced from said centerline;
said paddle being a generally flat element having a width extending between inner and outer edges thereof and twisted about its length into an Archimedes screw spiral having a pitch between adjacent turns which decreases from said inlet to said outlet, said paddle's inner edges defining a conically shaped space within said housing as said paddle extends from said inlet to said outlet;
said blade being a generally flat element having a width extending between inner and outer edges thereof and twisted about its length into in Archimedes screw spiral having a pitch different than that of said paddle; said outer edge of said blade affixed to said inner edge of said paddle at discrete length positions of said blade; and
shaft means affixed to said blade for rotating said rotor relative to said housing for driving fluid between said housing and said paddle to cause said blade to channel the fluid into said space at said outlet.
2. A machine as defined in claim 1 wherein said paddle pitch varies from about zero to about ninety degrees.

3. A machine as defined in claim 1 wherein said rotor includes a circular ring positioned near said rotor back end and lying in a plane perpendicular and centered to the center line of said rotor longitudinal axis.

4. A machine as defined in claim 3 wherein said paddles converge onto said circular ring.

5. A machine as defined in claim 3 wherein the largest diameter of said rotor is defined by the diameter of said circular ring.

6. A machine as defined in claim 1 wherein said paddle inner edge surface has different edge configurations changing along said paddle length.

7. A machine as defined in claim 1 wherein said paddle outer edge surface has different edge configurations changing along said length.

8. A machine as defined in claim 1 wherein said blade width varies from said rotor frontal end to said rotor back end.

9. A machine as defined in claim 1 wherein said blade interior edge surface has different edge configurations changing along said blade length.

10. A machine as defined in claim 1 wherein said blade exterior edge surface has different edge configurations changing along said blade length.

11. A machine as defined in claim 8 wherein said blade exterior edge surface has different edge configurations changing along said blade length.

12. A machine as defined in claim 8 wherein said blade interior edge surface has different edge configurations changing along said blade length.

13. A machine as defined in claim 1 wherein said blade particularly curves about said rotor longitudinal axis near said rotor frontal end.

14. A machine as defined in claim 5 wherein said blades converge into said circular ring.

15. A machine as defined in claim 5 wherein said blades extend beyond said circular ring.

16. A machine as defined in claim 15 wherein said interior and exterior edges of said extended blade portion lie in a plane perpendicular to the peripheral surface of said rotor chamber.

17. A machine as defined in claim 16 wherein said extended blade portion has some angular pitch relative to said rotor longitudinal axis.

18. A machine as defined in claim 5 wherein said blade is attached to said circular ring.

19. A machine as defined in claim 1 wherein the number of said paddles is different from the number of said blades.

20. A machine as defined in claim 1 having a diffuser near said rotor chamber outlet.

21. A machine as defined in claim 1 including a second housing externally surrounding said rotor chamber which defines a leak chamber which collects escaping fluid from said rotor chamber.

22. A machine as defined in claim 21 wherein said leak chamber includes leak injectors located at the peripheral edge of said rotor chamber inlet, said leak injectors being curved such that the openings in said leak injectors project fluid into the interior of said rotor chamber.

23. A machine as defined in claim 1 including an impulsor comprising at least one paddle and at least one blade and having a paddle-blade configuration similar to said rotor wherein said impulsor channels fluid from said chamber inlet into said rotor when said impulsor rotates.

24. A machine as defined in claim 23 wherein said rotor shaft is coupled to said impulsor.

25. A machine as defined in claim 1 including a compressor, said compressor having at least one channel blade positioned between said rotor chamber inlet and said rotor frontal end.

26. A machine as defined in claim 23 including a compressor, said compressor having at least one channel blade positioned between said rotor chamber inlet and said impulsor.

27. A machine as defined in claim 26 wherein said channel blades have a length extending from said rotor chamber peripheral edge which is less than the radius of said rotor chamber inlet.

28. A machine as defined in claim 3 including circular elements about the peripheral edge of said rotor chamber and located near said rotor circular ring, said circular element interacting with said rotor to maintain said rotor in a predefined position along the longitudinal axis of said rotor chamber and prevent fluid from escaping said rotor.

29. A machine ad defined in claim 3 including sealing rings to control fluid loss from said rotor chamber, said seals positioned near said rotor chamber inlet, rotor chamber outlet and in the interior of said chamber.

30. A machine as defined in claim 29 wherein said interior chamber sealing rings are positioned near said circular elements.

31. A machine as defined in claim 1 wherein said rotor chamber rotates.

32. A machine as defined in claim 1 including a third housing surrounding said second housing defining said flow chamber, said flow chamber having a flow inlet and a flow injector, said flow inlet located at said peripheral edge of said near rotor chamber outlet and curved toward the interior of said rotor chamber, said flow injector located at the peripheral edge of said rotor chamber near said rotor chamber inlet and curved toward the interior of said rotor chamber.

33. A machine as defined in claim 32 including circular elements about the peripheral edge of said rotor chamber and located near said rotor circular ring, said circular elements interacting with said rotor to maintain said rotor in a predefined position along the longitudinal axis of said rotor chamber and preventing fluid from escaping said rotor.

34. A machine as defined in claim 33 including a boring forming a passage between said flow chamber and said circular elements, said passage communicating a fluid pressure from said flow chamber to said circular elements to move said circular elements to and from said rotor chamber peripheral surface to interact with and reposition said rotor.

35. A machine as defined in claim 1 including fuel supply injectors and electric electrodes near said rotor chamber outlet.

* * * * *